297-270.5 SR
M2691 OR AI00008

A. Wood,

Rocking Chair,

No. 8, A.I. Apr. 24, 1838.

AF
No 8

Improvements in
Running or Easy Chairs, patented June 28, 1898.

When the foot rest a is not in use it is turned down upon the foot board b with the strap d folded between them.

Figure 1:
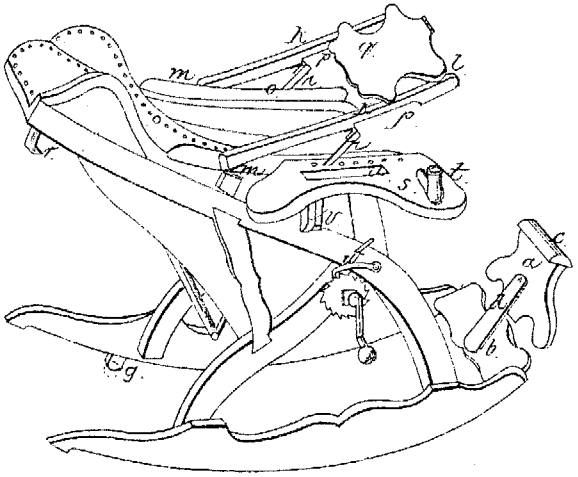
Figure 2:
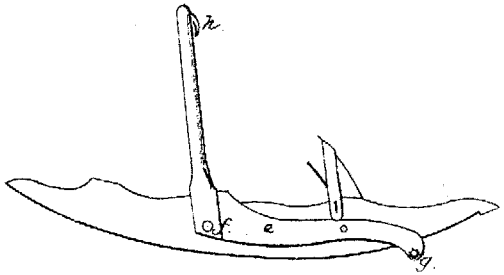

Fig 2 shows a right angled rocking bar c, pivoted at f, & carrying a roller g. Operated by pulling on upper end or passing a cord from the ring h, over a pulley on the chair & back to the occupant.

Writing table K consists of arms R hinged at m so as to swing over the back, & carrying a cross bar l. Props n support table at an inclination. Table p is hinged to cross bar l so as to fare over top of back when folded out of the way.

Wing s is pivoted to arm to fall down when the prop w is released, & inclined t & pentrough u are pivotally mounted so that their centers of gravity will cause them to maintain vertical position when wing is open or folded.

Dog w holds back from falling down.